(12) United States Patent
Fujihara

(10) Patent No.: US 7,480,729 B2
(45) Date of Patent: Jan. 20, 2009

(54) LINE CONCENTRATOR, NETWORK-CAPABLE APPARATUS, AND COMMUNICATION SYSTEM

(75) Inventor: Akiyoshi Fujihara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 530 days.

(21) Appl. No.: 10/547,682

(22) PCT Filed: Mar. 2, 2004

(86) PCT No.: PCT/JP2004/002556

§ 371 (c)(1),
(2), (4) Date: Sep. 2, 2005

(87) PCT Pub. No.: WO2004/080000

PCT Pub. Date: Sep. 16, 2004

(65) Prior Publication Data

US 2006/0191435 A1  Aug. 31, 2006

(30) Foreign Application Priority Data

Mar. 6, 2003  (JP)  ............................. 2003-060353

(51) Int. Cl.
  *G06F 15/16* (2006.01)
(52) U.S. Cl. ................... 709/232; 709/220; 709/224; 709/228; 709/229
(58) Field of Classification Search ................ 709/220, 709/224, 228, 229, 232
See application file for complete search history.

(56) References Cited

U.S. PATENT DOCUMENTS

| | | | | |
|---|---|---|---|---|
| 5,404,544 A | * | 4/1995 | Crayford | ..................... 713/310 |
| 5,440,560 A | * | 8/1995 | Rypinski | ..................... 370/457 |
| 6,105,143 A | * | 8/2000 | Kim | ............................ 713/324 |
| 6,807,907 B2 | | 10/2004 | Yamada | |
| 7,107,442 B2 | * | 9/2006 | Cheshire | ........................ 713/1 |
| 2002/0083356 A1 | | 6/2002 | Dai | |
| 2003/0028677 A1 | | 2/2003 | Fukuhara | |
| 2003/0126486 A1 | | 7/2003 | Bui | |
| 2004/0255008 A1 | * | 12/2004 | Olsen et al. | ................. 709/220 |

FOREIGN PATENT DOCUMENTS

| | | |
|---|---|---|
| JP | 10-093614 A | 4/1998 |
| JP | 2000-165419 A | 6/2000 |
| JP | 2001-345980 A | 12/2001 |

(Continued)

Primary Examiner—Michael Won
(74) Attorney, Agent, or Firm—Birch, Stewart, Kolasch & Birch, LLP

(57) ABSTRACT

In a system configured by connecting a printer (2) and a host device (3) to a line concentrator (1), an arrangement is made such that the printer (2) is held in power save mode for a for a long time to achieve power savings. When transferring to the power save mode, the printer (2) transmits internal information to the line concentrator (1). The line concentrator (1) stores this internal information in association with the printer (2). When an inquiry about the internal information is made from the host device (3) to the printer (2), the line concentrator (1) does not transmit this inquiry to the printer (2) but returns a response (proxy response) to the host device (3) by using the internal information stored in the line concentrator (1) itself. This makes it unnecessary to cancel the power save mode of the printer (2) as a result of the inquiry.

6 Claims, 6 Drawing Sheets

FOREIGN PATENT DOCUMENTS

| | | |
|---|---|---|
| JP | 2002-171273 A | 6/2002 |
| JP | 2002-247062 A | 8/2002 |
| JP | 2002-287936 A | 10/2002 |
| JP | 2003-76451 A | 3/2003 |
| WO | WO-2001-057631 A1 | 8/2001 |

* cited by examiner

FIG. 4

| INTERNAL INFORMATION REQUEST COMMAND | COMMUNICATIONS PORT 1 | COMMUNICATIONS PORT 2 | ...... |
|---|---|---|---|
| COM 01 | (CASSETTE 1, PAPER OUT) (CASSETTE 2, A4) | (CASSETTE 1, A4) (CASSETTE 2, B4) | ...... |
| COM 02 | (TONER REMAINDER, LITTLE) | (TONER REMAINDER, SUFFICIENT) | ...... |
| COM 03 | (PAPER PATH, NORMAL) | (PAPER PATH, JAM) | ...... |

LINE CONCENTRATOR, NETWORK-CAPABLE APPARATUS, AND COMMUNICATION SYSTEM

TECHNICAL FIELD

The present invention relates to a line concentrator which configures a star network by connecting a plurality of network-compatible apparatuses and relays transmission of communication data, the network-compatible apparatuses connected to the line concentrator, and a communication system configured by the line concentrator and the network-compatible apparatuses.

BACKGROUND ART

Conventionally, a processing apparatus that is connected to a network and performs specific operation according to an externally entered processing request (hereinafter referred to as a network-compatible apparatus), such as an image forming apparatus, is so controlled as to transfer to power save mode (also known as low power consumption mode or sleep mode, for instance) in which power supply to such constituent parts (circuits) as a heater and clock oscillation, for instance, are interrupted for the sake of power savings if no external processing request signal is received for a specific period of time. Even in a state of such power save mode, part or the entirety of a communications section of the apparatus performing communication with external devices is kept operating to ensure that the apparatus which has been stopped to operate would be automatically returned to normal operating conditions according to an externally received signal. Here, external requests include an inquiry about the internal status of the network-compatible apparatus (i.e., a request for a response concerning the internal status), for instance, besides processing requests (e.g., a request for printing print data in the case of an image forming apparatus). Causing the apparatus to return from the power save mode to normal mode each time an inquiry about the internal status is received would become a hindrance to power savings.

To overcome the problem, Japanese Patent Application Publication No. 2001-345980 proposes an apparatus in which an communications section stores information about the internal status of the apparatus at the time of transfer to low power consumption mode, and when an inquiry about the internal status is received, the communications section returns a response to prevent the apparatus from unnecessarily returning to normal mode.

Also, Japanese Patent Application Publication No. 2000-165419 proposes a system in which, when a client apparatus transfers to sleep mode, the client apparatus notifies a server to which the client apparatus is connected via a network that the client apparatus is transferring to the sleep mode, and when the server monitoring the network detects a message to the client apparatus which is currently in the sleep mode, the server returns a response in lieu of the client apparatus according to previously stored information. In this case, the client apparatus is held in the sleep mode until the server detects a message which falls out of the previously stored information content, thereby preventing unnecessary returning to normal mode.

According to technology shown in Japanese Patent Application Publication No. 2001-345980, however, the communications section of each network-compatible apparatus must carry out an operation for judging whether the content of an externally received signal is a request (inquiry) which can be responded to without causing the apparatus to return to the normal mode as well as an operation for responding to the inquiry. As a CPU which requires relatively large power consumption must be kept operational for performing these operations, there has been a problem that it is impossible to achieve sufficient power savings.

According to technology shown in Japanese Patent Application Publication No. 2000-165419, on the other hand, a communications section or the like of a network-compatible apparatus must carry out an operation for judging whether the content of a received signal is a return command causing the apparatus to return to the normal mode from the server. Consequently, there has been a problem that a CPU must be kept operational for performing this judgment operation. In a case where the technology shown in Japanese Patent Application Publication No. 2000-165419 is applied to a star network, and not a bus network, employing a device for performing communication data routing control, such as a switching hub (hub, line concentrator), there can arise a case where a transmitted signal (data) addressed to each network-compatible apparatus is not transferred to (does not reach) the server depending on a connecting position of the server. Thus, there has been a problem that the connecting position of the server in the network is restricted. Star networks employing a hub (line concentrator) are widely used since the number of network-compatible apparatuses connected to the network can be easily increased and decreased, and therefore, restrictions on such widely used networks would pose a practical problem.

Accordingly, the invention has been made in view of the problems. It is an object of the invention to provide a line concentrator which can prevent a network-compatible apparatus from unnecessarily returning from power save mode to normal mode in response to an inquiry from another network-compatible apparatus and thereby reduce power consumption of the network-compatible apparatus during the power save mode as much as possible in a star network configured by connecting a plurality of network-compatible apparatuses via the line concentrator. It is a further object of the invention to provide network-compatible apparatuses connected to such a line concentrator and a communication system configured by those devices.

DISCLOSURE OF THE INVENTION

To achieve the objects, the present invention provides a line concentrator having a plurality of communication ports for relaying transmissions of communication data exchanged among network-compatible apparatuses connected through the communication ports, including:

a response storage portion for storing specific response request information and corresponding response information in association with each other;

a destination information storage portion for storing destination information of the network-compatible apparatuses connected through the communication ports individually for part or all of the communication ports;

a response necessity information storage portion for storing response necessity information indicating whether it is necessary to perform a specific response operation or not for each piece of the destination information; and a control unit for performing:
  a communication data judgment operation for judging whether the communication data is
    a first communication data which can be answered by returning a proxy response, the first communication data containing, as well as the response request information stored in the response storage portion, a destination included in the destination information stored in the destination storage portion and the response necessity information indicating that it is necessary to respond, a second communication data which can not be answered by returning a proxy response, the second communication data not containing the response request information stored in the response storage portion, or an unanswerable communication data other than the first and second communication data;

a transmission prohibit operation for prohibiting signal transmission to the communication port connected to the network-compatible apparatus corresponding to the destination information for which the response necessity information indicates that it is necessary to respond in the case of the unanswerable communication data and the first communication data; and a proxy response operation for transmitting the response information corresponding to the response request information contained in the first communication data to the network-compatible apparatus from which the first communication data has been sent.

Line concentrators are used in many cases when configuring a network. The line concentrator is connected at a position where the line concentrator can control whether or not to transmit a signal to each network-compatible apparatus connected to the network. With the provision of a proxy response function which enables the line concentrator to respond in lieu of a network-compatible apparatus connected to the network to a processing request from another apparatus, it is possible to prohibit signal transmission to the network-compatible apparatus which is currently in power save mode, for instance, as long as the line concentrator can return a proxy response. With this arrangement, it is just needed for each network-compatible apparatus to keep only a simple circuit, for example, for causing the network-compatible apparatus to automatically return to normal operation from the power save mode, for instance, by detecting the occurrence of a signal transmitted from the line concentrator. This means that it is not necessary to keep a CPU or the like operational for examining the content of the signal to determine whether the signal transmitted from the line concentrator is addressed to own apparatus and whether the signal is a processing request which requires the apparatus to revert from the power save mode, for instance. It is therefore possible to achieve further power savings. The line concentrator itself needs to be kept continuously operating as long as some apparatus (network-compatible apparatus) on the network is operating and even a single line concentrator can return proxy responses to many network-compatible apparatuses. Therefore, the larger the scale of the network, the greater the power saving effect produced by the line concentrator.

If the communication data is the second communication data, the control unit may transmits a specific signal to the communication port connected to the network-compatible apparatus that is a destination of the second communication data and transmits a specific response to the communication port after receiving a specific response to the transmitted signal.

With this arrangement, it is possible to transfer (transmit) the second communication data (the communication data which can not be answered by returning a proxy response) after waiting completion of reverting from the power save mode, for instance, of the network-compatible apparatus and thereby prevent a failure in data transmission.

If the response storage portion stores the response request information and the response information individually for part or all of the communication ports, it is possible to return a responses suited to each network-compatible apparatus even when different kinds of network-compatible apparatuses are connected to the communication ports.

The present invention may be construed as a network-compatible apparatus, including:

a communication port that is connected to a line concentrator;

a power supply for supplying electric power suited for normal mode and electric power suited for power save mode; and a signal monitoring section for detecting signal transmission from the line concentrator during the power save mode and causing the power supply to transfer to the normal mode when the signal transmission is detected regardless of signal content.

When in the power save mode, the network-compatible apparatus need not examine the content of a signal sent from the line concentrator but it is just needed for the network-compatible apparatus to keep only a simple circuit, for example, for causing the network-compatible apparatus to automatically return to normal operation from the power save mode, for instance, by detecting the occurrence of a signal transmitted from the line concentrator. It is therefore possible to achieve further power savings than in a conventional arrangement.

If the network-compatible apparatus further includes a response information transmission unit for transmitting specific response request information and corresponding response information to the line concentrator, it is not necessary to provide the aforesaid line concentrator with input means for entering the aforesaid response request information, for instance.

Also, the present invention may be construed as a communication system (network system) configured by connecting one or more of the network-compatible apparatuses by use of one or more of the line concentrators.

BRIEF DESCRIPTION OF THE DRAWINGS

FIG. 4 is a diagram showing an example of response request information and response information stored in the proxy hub constituting the communication system X according to the invention;

BEST MODE FOR CARRYING OUT THE INVENTION

Referring now to the accompanying drawings, an embodiment of the present invention is described below to permit an understanding of the invention. The embodiment of the present invention is just a specific example of the invention and is not intended to limit technological scope of the invention.

Figure 1:
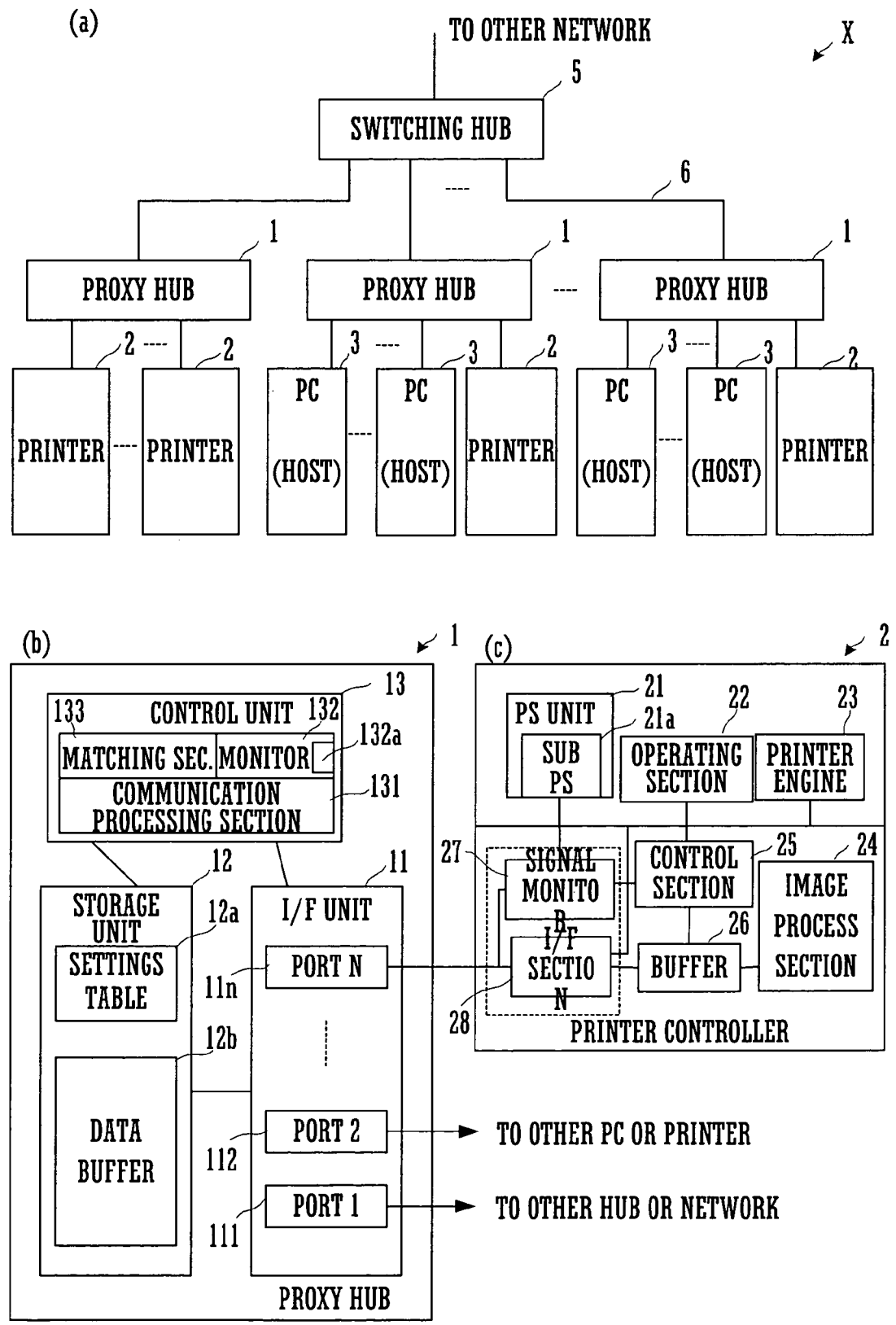
FIG. 1 is a block diagram showing a communication system X according to the present invention and a general configuration of principal parts of proxy hubs and printers constituting the communication system X.
Figure 2:
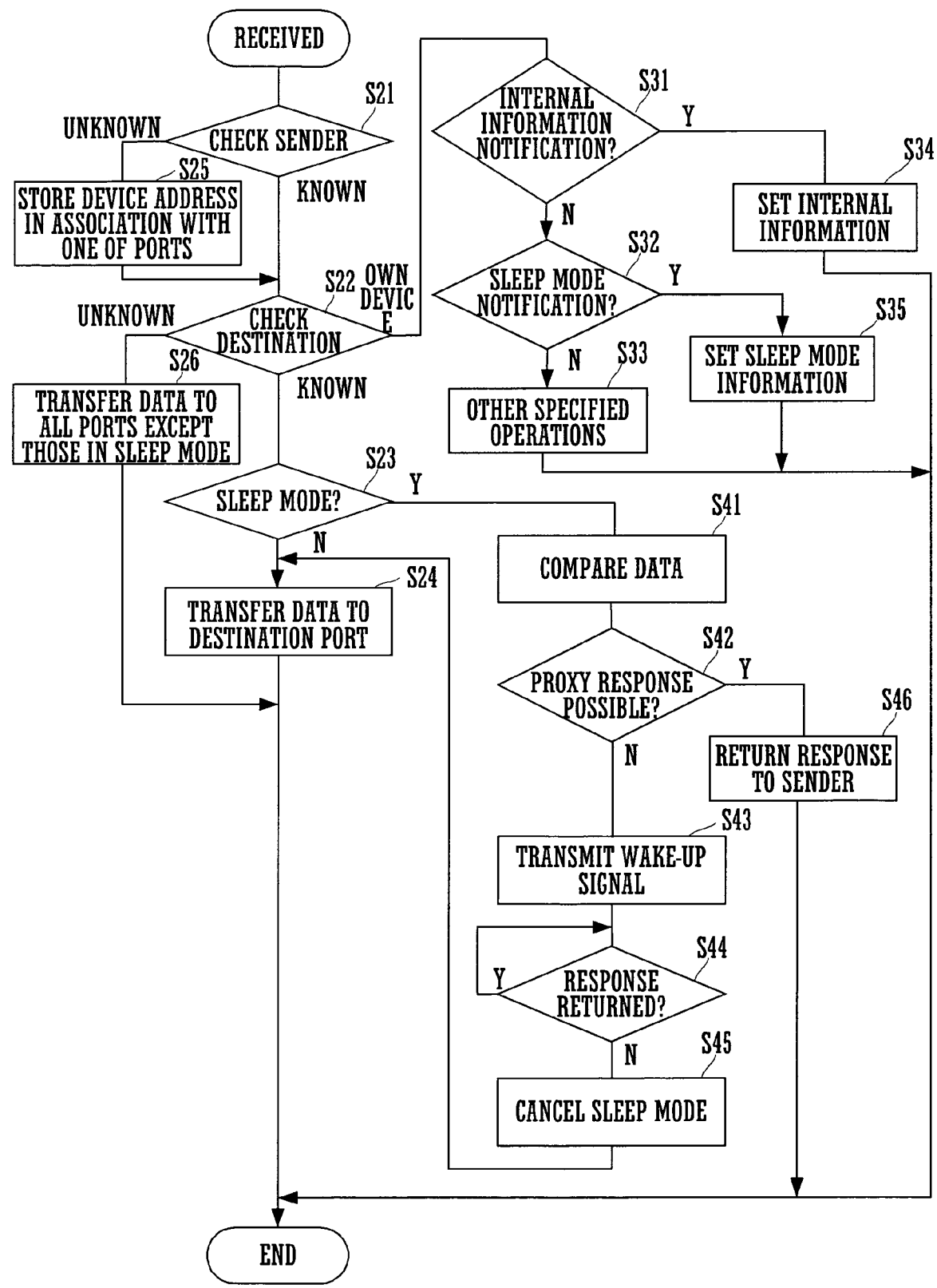
FIG. 2 is a flowchart showing an operating procedure including a proxy response operation performed by the proxy hub constituting the communication system X according to the invention.
Figure 3:
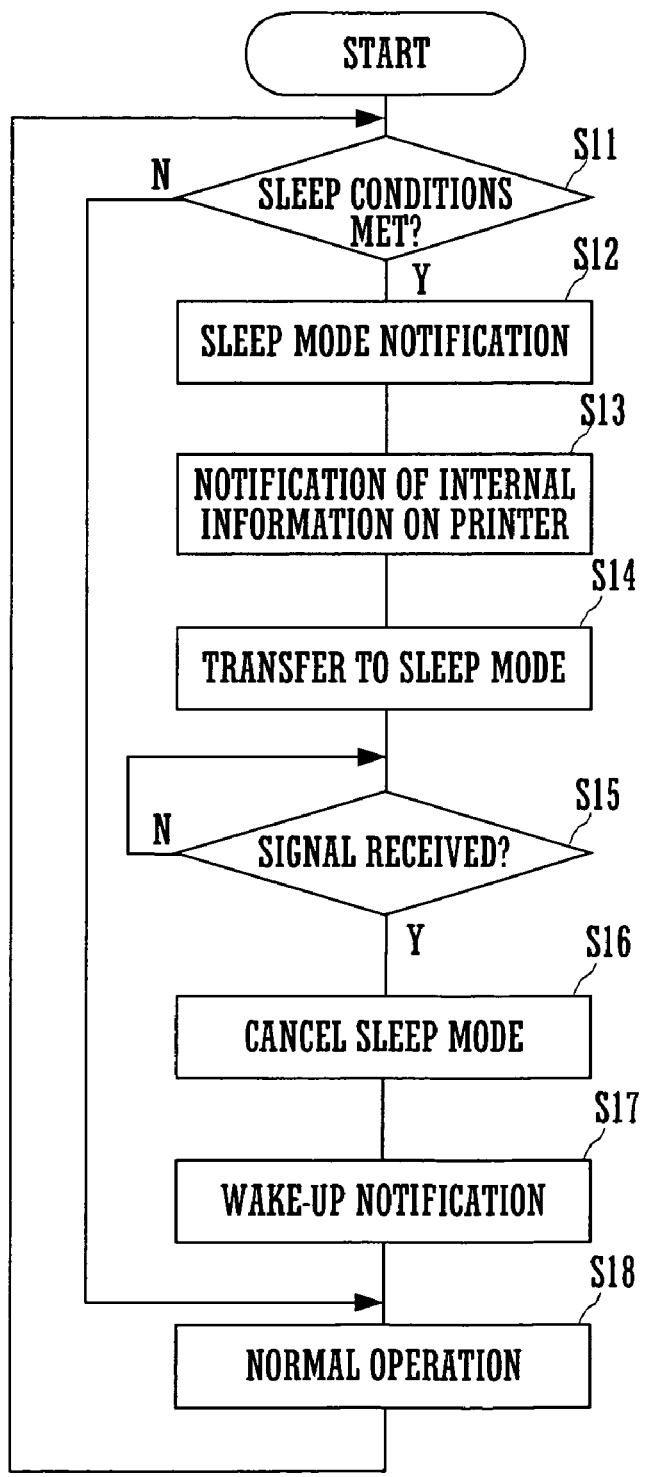
FIG. 3 is a flowchart showing an operating procedure including transfer to sleep mode and cancellation thereof of the printer constituting the communication system X according to the mode of carrying out the invention.
Figure 5:
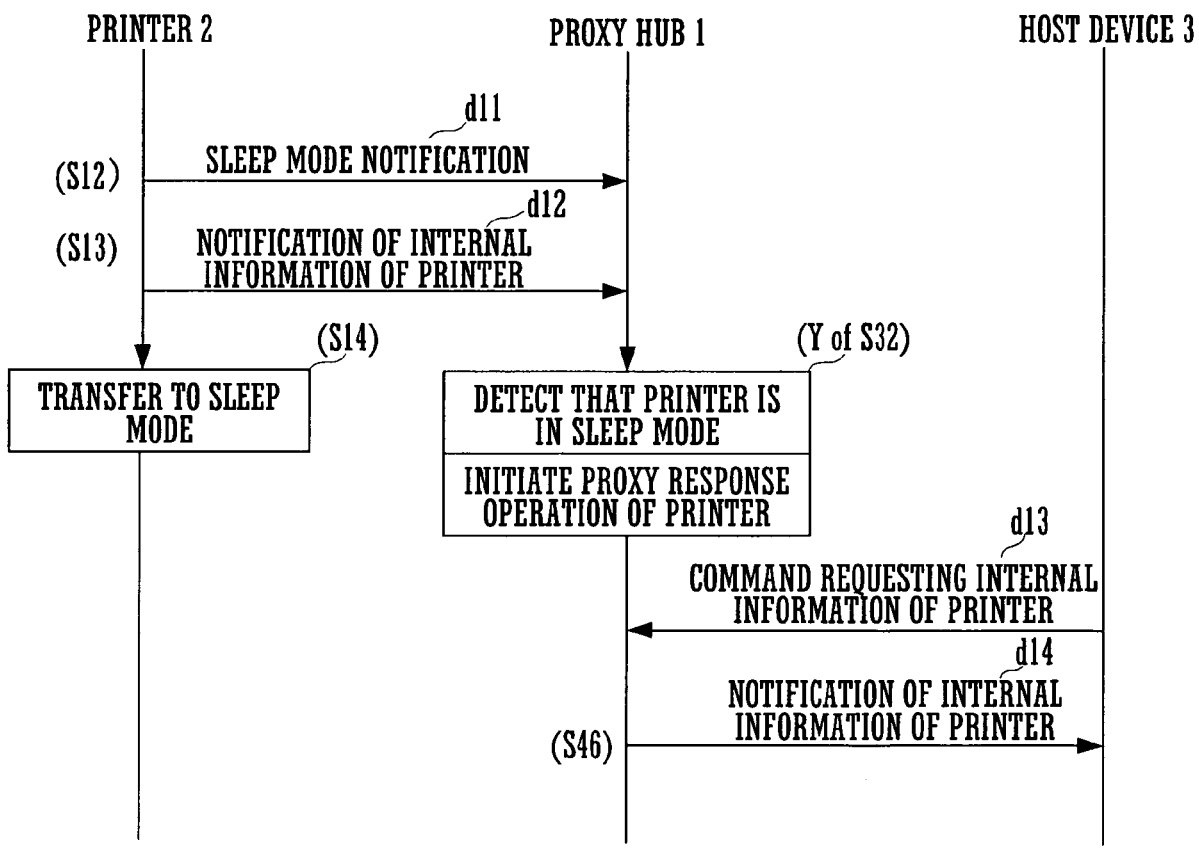
FIG. 5 is a sequence chart applied when the printer transfers to the sleep mode and the proxy hub performs the proxy response operation in the communication system X according to the invention.
Figure 6:
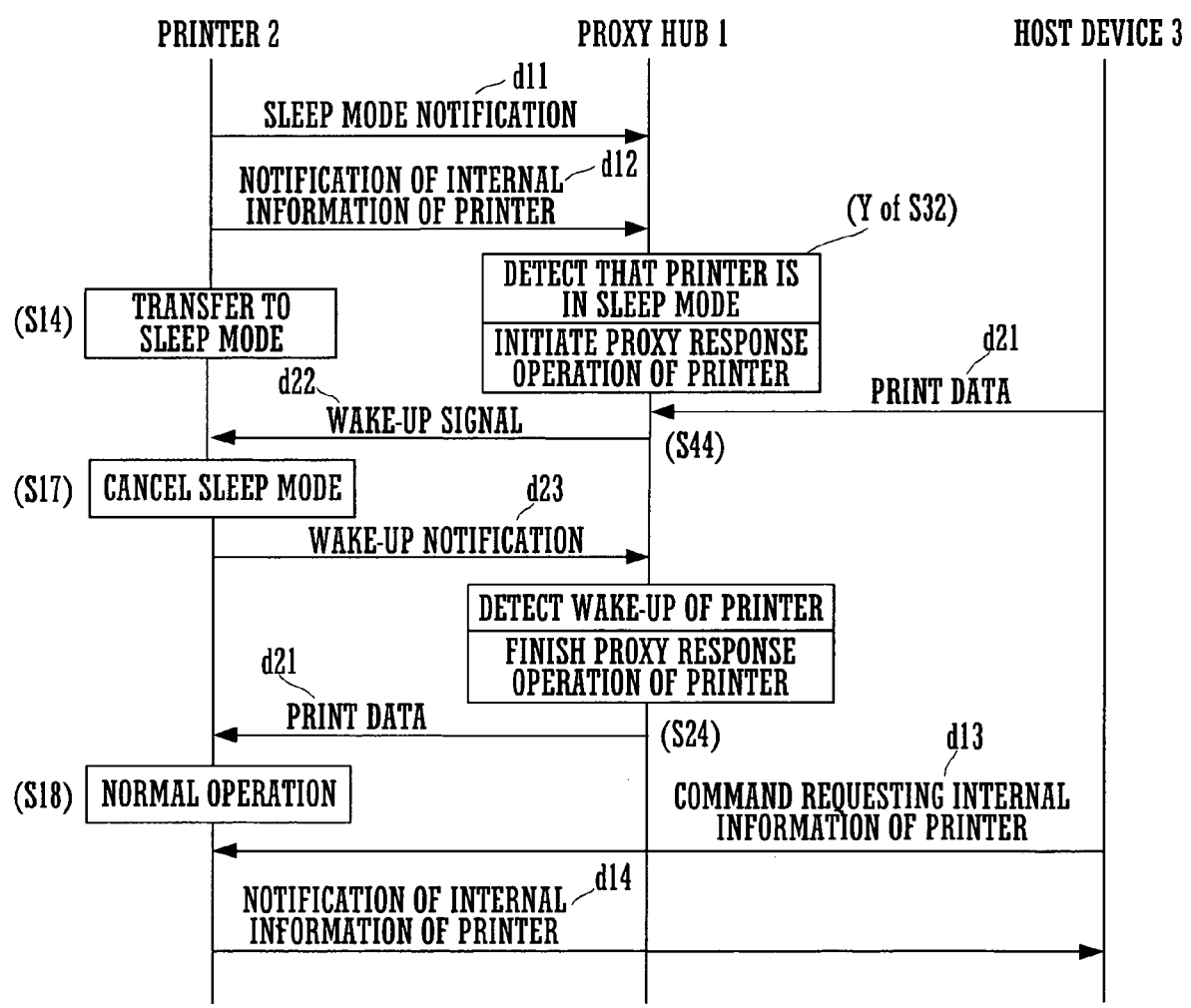
FIG. 6 is a sequence chart applied when the sleep mode is canceled after the printer has transferred to the sleep mode in the communication system X according to the invention.

FIG. 1 is a block diagram showing a communication system X according to the present invention and a general configuration of principal parts of proxy hubs and printers constituting the communication system X, FIG. 2 is a flowchart showing an operating procedure including a proxy response operation performed by the proxy hub constituting the communication system X according to the invention, FIG. 3 is a flowchart showing an operating procedure including transfer to sleep mode and cancellation thereof of the printer constituting the communication system X according to the mode of carrying out the invention, FIG. 4 is a diagram showing an example of response request information and response information stored in the proxy hub constituting the communication system X according to the mode of carrying out the invention, FIG. 5 is a sequence chart applied when the printer transfers to the sleep mode and the proxy hub performs the proxy response operation in the communication system X according to the mode of carrying out the invention, and FIG. 6 is a sequence chart applied when the sleep mode is canceled after the printer has transferred to the sleep mode in the communication system X according to the mode of carrying out the invention.

Referring first to FIG. 1, the communication system X according to the mode of carrying out the present invention and the configuration of the principal parts of the proxy hubs and the printers constituting the communication system X are explained.

As shown in FIG. 1(a), the communication system X includes a plurality of proxy hubs 1 (line concentrators), printers 2 (network-compatible apparatuses) connected to the individual proxy hubs 1 and host devices 3, such as personal computers, also connected to the proxy hubs 1. Further, the proxy hubs 1 are individually connected to a switching hub 5, the proxy hubs 1 and the switching hub 5 together forming a star network. The switching hub 5 and the proxy hubs 1, and the proxy hubs 1 and the printer 2 are connected by communication cables 6 like 10BASE-T cables, for example. While the proxy hubs 1 are interconnected by the switching hub 5 in FIG. 1(a), any of the proxy hubs 1 may be connected to the other proxy hubs 1.

With such a network configuration, communication data exchanged between the host devices 3 and the printers 2 are relayed by the proxy hubs 1 and the switching hub 5.

As shown in FIG. 1(b), each of the proxy hubs 1 includes a plurality of communication ports 111, 112, . . . , 11n (hereinafter referred to collectively as an I/F unit 11) serving as ports for connecting such external devices as the host devices 3, a storage unit 12 which is storage means having a settings table storage region 12a for storing a specific setting data table and a data buffer region 12b for temporarily storing communication data received from an external device via the I/F unit 11, and a control unit 13 for controlling communication data transmission performed by the relevant proxy hub 1.

Further, the control unit 13 includes a communication processing section 131, a monitoring section 132 and a matching section 133.

The communication processing section 131 receives communication data input from external devices through the communication ports 111, 112, . . . , 11n, causes the data buffer 12b to temporarily store the input communication data, and relays the communication data to the external device(s) through one or more of the multiple communication ports 111, 112, . . . , 11n according to destination information contained in the communication data.

The monitoring section 132 is provided with a memory 132a. The monitoring section 132 extracts identification information (MAC address or IP address, for example) of a sender of the communication data from each set of communication data temporarily stored in the data buffer 12b under the control of the communication processing section 131 and stores the extracted identification information for each of the communication ports 111, 112, . . . , 11n through which the communication data has been received. This identification information is stored as destination information of the external device (network-compatible apparatus) connected through each of the communication ports 111, 112, . . . , 11n. The identification information thus stored is used for controlling communication data transmission thereafter. The memory 132a of the monitoring section 132 of this embodiment corresponds to the destination information storage portion and a response necessity information storage portion.

The matching section 133 extracts request information addressed to a destination of communication data from each set of communication data temporarily stored in the data buffer 12b under the control of the communication processing section 131 and examines whether the extracted request information matches any request information previously stored in the settings table storage region 12a. The request information includes an information about a request for performing a print job and a request for a response concerning status (an inquiry about the status), for example.

As shown in FIG. 1(c), a printer controller constituting the principal part of the printer 2 includes a power supply unit 21 for supplying electric power to individual parts of the apparatus, an operating section 22 which may be a touch panel, for instance, for entering various settings for the printer 2, a communications I/F section 28 for transmitting and receiving communication data to and from the host devices 3 via the proxy hub 1, a buffer 26 for temporarily storing print data (communication data) received by the communications I/F section 28, an image processing section 24 for generating image data used for an image forming operation according to the image data stored in the buffer 26, for instance, a printer engine 23 for controlling devices for forming an image on a specific sheet of paper based on the image data generated by the image processing section 24, a control section 25 for performing various control operations of the entire printer 2, and a signal monitoring section 27 for detecting signal transmission from the proxy hub 1.

The signal monitoring section 27 is, for example, a simple, low-power-consumption circuit including a signal detection circuit for detecting whether any transmission signal (communication signal) is present by detecting voltage of a signal transmitted through the communication cable 6, for instance, and a switch circuit for switching a connections between the power supply unit 21 and the control section 25 and between the power supply unit 21 and the communications I/F section 28. The power supply unit 21 includes a sub power supply 21a for supplying a minimum amount of electric power necessary for operating the signal monitoring section 27 when the printer 2 is in the sleep mode (power save mode) which is a state in which power supply to the printer engine 23, such devices as a heater controlled by the printer engine 23, the control section 25 and the communications I/F section 28 is interrupted. In the following discussion, a state in which the electric power supply is not limited as in the sleep mode, or a state in which the sleep mode is canceled, is referred to as normal mode. In addition, an act of transferring from the sleep mode to the normal mode is referred to as "wake-up."

Referring next to a flowchart of FIG. 3, the operating procedure including transfer to the sleep mode and cancellation thereof of the printer 2 is explained. In the following discussion, S11, S12 and so on indicate numbers of the operating procedure (steps).

When the printer 2 is started by power-on, the printer 2 is initially set to the normal mode (not shown). While judging whether conditions for transferring to the sleep mode (sleep conditions) have been satisfied (S11) in this state, the control section 25 performs specific normal operations (S18) until the sleep conditions are met. Here, the sleep conditions are that no signal received from the proxy hub 1 (signal input) is detected by the signal monitoring section 27 for a specific period of time or more. Alternatively, the sleep conditions may be that, as the signal monitoring section 27 monitors the buffer 26, the printer 2 remains in a state in which communication data containing a specific processing request to which the proxy hub 1 can not respond by returning a proxy response (later discussed) is not temporarily stored in the buffer 26 under the control of the communications I/F section 28 for a specific period of time or more. The normal operations include such operations as extracting request information contained in the communication data temporarily stored in the buffer 26, returning information concerning the status of the printer 2 (e.g., currently loaded paper size and the amount of remaining toner) if the request information is an inquiry about the status of the printer 2, and controlling the printer 2 such that the image processing section 24 and the printer engine 23 work together to form an image on a specific sheet of paper if the request information is a print job request.

If the sleep conditions are judged to have been satisfied at S11, the control section 25 makes a sleep mode notification to notify the proxy hub 1 serving as a destination (e.g., MAC address or IP address) to which the printer 2 is connected that the relevant printer 2 is transferring to the sleep mode via the communications I/F section 28 (S12), and notifies the proxy hub 1 of internal information which is information about the internal status of the printer 2 (S13, operation for transmitting the response information). The internal information includes, for example, information about paper loaded in a paper cassette provided in the printer 2 (e.g., paper size or paper-out status), information about the amount of remaining developing agent, and information about conditions of a paper transport path (e.g., normal or the occurrence of a jam).

Next, power supply from the power supply unit 21 is limited and the printer 2 transfers to the sleep mode in which only the signal monitoring section 27 is held under operating conditions by the electric power supplied from the sub power supply 21a (S14). Once transferred to the sleep mode, the printer 2 is held in the sleep mode until a signal received from the proxy hub 1 is detected by the signal monitoring section 27 (N side of S15).

When the signal monitoring section 27 detects a signal received from the proxy hub 1 to which the printer 2 is connected, the signal monitoring section 27 cancels limitations on the power supply from the power supply unit 21 whereby the sleep mode is canceled (S16).

Further, upon completion of cancellation of the sleep mode, the control section 25 transmits a wake-up notification indicating that the printer 2 has returned to the normal mode to the proxy hub 1 serving as the destination (e.g., MAC address or IP address) to which the relevant printer 2 is connected via the communications I/F section 28 (S17). Then, the printer 2 returns to S18 and S11 discussed above and reexecutes the operating procedure.

Referring next to the flowchart of FIG. 2, the operating procedure of the proxy response operation by which the proxy hub 1 responds in lieu of the printer 2 is explained. The procedure of FIG. 2 is executed continuously and repeatedly by the proxy hub 1.

When communication data fed through any of the communication ports 111, 112, . . . , 11n is temporarily stored in the data buffer 12b under the control of the communication processing section 131, the monitoring section 132 examines a device address (identification information) of the sender of the communication data (S21). If this identification information indicates a device address which has not been stored yet in the monitoring section 132 for any of the communication ports 111, 112, . . . , 11n through which the communication data has been received, that is, if the communication data is communication data falling out of the range (unanswerable communication data), the device address is stored in the memory 132a of the monitoring section 132 in association with one of the communication ports 111, 112, . . . , 11n through which the communication data has been received, and the proxy hub 1 proceeds to S22. The device address (identification information) is stored as destination information of the external device (network-compatible apparatus) connected through each of the communication ports 111, 112, . . . , 11n. On the other hand, if the device address of the sender is a device address already stored in the monitoring section 132 for one of the communication ports 111, 112, . . . , 11n through which the communication data has been received, the proxy hub 1 directly proceeds to S22.

Next, the monitoring section 132 examines a destination (recipient) of the communication data temporarily stored in the data buffer 12b (S22). If this destination is the identification information of own device (the relevant proxy hub 1), the monitoring section 132 examines whether the relevant communication data (unanswerable communication data) is a notification of the internal information of the printer 2 (refer to S13 of FIG. 3) or the sleep mode notification (refer to S12 of FIG. 3) (S31, S32). In this case, the communication data is not transmitted to any of the communication ports 111, 112, . . . , 11n. If the communication data is judged to be a notification of the internal information (Y side of S31), the monitoring section 132 causes the settings table storage region 12a of the storage unit 12 to store the internal information (S34). If other internal information is already stored in the settings table storage region 12a, the monitoring section 132 updates the internal information stored in the settings table storage region 12a. At this point, an operational sequence is finished and steps from S21 are reexecuted. If the communication data is not the internal information either (N side of S31), the proxy hub 1 proceeds to S32 at which the monitoring section 132 examines whether the relevant communication data is the sleep mode notification (S32). If the communication data is judged to be the sleep mode notification (Y side of S32), the monitoring section 132 stores information indicating that a particular device is in the sleep mode in the memory 132a of the monitoring section 132 in association with one of the communication ports 111, 112, . . . , 11n through which the communication data has been received (S35). At this point, the operational sequence is finished and steps from S21 are reexecuted. If the communication data is neither the notification of the internal information nor the sleep mode notification (N side of S32), the proxy hub 1 executes other specified operations (S33) and finish the operational sequence.

FIG. 4 shows an example of the setting data table containing the internal information stored in the settings table storage region 12*a* of the storage unit 12 at S34.

The setting data table stores the internal information (response information) received from the printers 2 in response to each of internal information request commands (response request information) asking for the internal information of the printers 2 for each of the communication ports 111, 112, . . . , 11*n*. In the example of FIG. 4, the internal information request command "COM01" is a command asking for the internal information about paper loaded in the paper cassette provided in the printer 2 (e.g., paper size or paper-out status), the internal information request command "COM02" is a command asking for the internal information about the amount of developing agent (toner) left in the printer 2 (e.g., sufficient or little or toner-out), and the internal information request command "COM03" is a command asking for the internal information about conditions of the paper transport path (e.g., normal or the occurrence of a jam) of the printer 2.

On the other hand, if the destination of the communication data does not coincide with any device address stored in the monitoring section 132 at S22, the communication processing section 131 transmits (transfers) the relevant communication data (unanswerable communication data) to all the communication ports other than those for which the information indicating that relevant devices are in the sleep mode is stored in the memory 132*a* of the monitoring section 132. At this point, the operational sequence is finished and steps from S21 are reexecuted. At the same time, the communication data already transmitted from the data buffer region 12*b* is erased.

Also, if the destination of the communication data coincides with one of device addresses stored in the monitoring section 132 (i.e., the destination is known) at S22, the monitoring section 132 judges whether the information indicating that the device is in the sleep mode (i.e., the information set at S35) is set for one of the communication ports 111, 112, . . . , 11*n* corresponding to the known device address (S23).

Here, if the information indicating that the device is in the sleep mode is not set, the communication processing section 131 transmits (transfers) the relevant communication data (an example of the unanswerable communication data) only to the communication port corresponding to the destination of the communication data (S24). At this point, the operational sequence is finished and steps from S21 are reexecuted. At the same time, the communication data already transmitted from the data buffer region 12*b* is erased.

On the other hand, if, at S23, the information indicating that the device is in the sleep mode (i.e., response necessity information indicating that a response is needed) is set for one of the communication ports 111, 112, . . . , 11*n* corresponding to the known device address which is the destination of the communication data at S35, the matching section 133 compares the request information (e.g., a print job request or an inquiry about the status) contained in the communication data stored in the data buffer 12*b* with the internal information request commands stored in the setting data table (S41). If, as a result of this comparison, the request information matches one of the internal information request commands, it is judged that the proxy hub 1 can respond instead of (in lieu of) the printer 2 which is currently in the sleep mode (Y side of S42, this communication data is an example of communication data which can be answered by returning a proxy response). Then, the communication processing section 131 returns a response containing a piece of information corresponding to the internal information request command which the request information has matched as a result of comparison at S41, the piece of information being taken from among the internal status set (stored) for one of the communication ports 111, 112, . . . , 11*n* corresponding to the destination of the communication data, only to the sender of the communication data (S46). At this point, the operational sequence is finished and steps from S21 are reexecuted. The operation of S46 is an example of the proxy response operation.

As a consequence, the inquiry-related communication data addressed to the printer 2 which is currently in the sleep mode is not transmitted to the printer 2, so that it is possible to prevent the printer 2 from unnecessarily returning to the normal mode.

On the other hand, if the request information does not match any of the internal information request commands as a result of comparison at S41, that is, if the communication data is communication data which can not be answered by returning a proxy response, it is judged impossible for the proxy hub 1 to respond instead of (in lieu of) the printer 2 which is currently in the sleep mode (N side of S42). In this case, the communication processing section 131 transmits a specific wake-up signal to one of the communication ports 111, 112, . . . , 11*n* corresponding to the destination of the communication data (S43). The wake-up signal is a signal detected by the signal monitoring section 27 of the printer 2 at S15 of FIG. 3.

Subsequently, the proxy hub 1 waits under the control of the monitoring section 132 until the wake-up notification indicating that the printer 2 has returned to the normal mode (refer to S17 of FIG. 3) is returned (sent back) from the printer 2 (S44). The operation of S44 is an example of the transmission waiting control operation.

After the wake-up notification has been returned, the monitoring section 132 cancels a setting of the information indicating that the device is in the sleep mode stored in the monitoring section 132 for one of the communication ports 111, 112, . . . , 11*n* corresponding to the destination of the communication data (S45) and the proxy hub 1 proceeds to S24 described above. As a result, the communication processing section 131 transmits the communication data (e.g., print data requesting a print job) to which the relevant proxy hub 1 can not respond to one of the communication ports 111, 112, . . . , 11*n* corresponding to the destination of the communication data. Since the communication data is transmitted after the sleep mode has been canceled (S44), the communication data is received by the communications I/F section 28 of the printer 2 in a reliable fashion.

Here, decisions at S22, S23 and S42 constitute an example of the communication data judgment operation, while operations at S26, S24 and S46 constitute an example of the transmission prohibit operation.

Referring next to the sequence chart of FIG. 5, operations performed in this communication system X when the printer 2 transfers to the sleep mode and the proxy hub 1 returns a response in lieu of the printer 2 are described.

Before the printer 2 transfers to the sleep mode (S14), the sleep mode notification d11 and a notification d12 of the internal information are transmitted from the printer 2 to the proxy hub 1 (these operations correspond to S12 and S13 of FIG. 3).

On the other hand, when the proxy hub 2 detects reception of the sleep mode notification d11 and the notification d12 of the internal information addressed to own proxy hub 2 (this corresponds to the Y side of S32), the proxy hub 1 thereafter performs a specific response operation in lieu of the printer 2 which is currently in the sleep mode. Specifically, if communication data containing the internal information request command d13 addressed to the printer 2 is received from the host device 3, the proxy hub 1 transmits a notification d14 of the internal information corresponding to the internal information request command d13 to the host device 3 which is the sender of the internal information request command (this corresponds to S46 of FIG. 2).

As a consequence, the inquiry-related communication data addressed to the printer 2 which is currently in the sleep mode is not transmitted to the printer 2, so that it is possible to prevent the printer 2 from unnecessarily returning to the normal mode (or from waking up).

Referring next to the sequence chart of FIG. 6, operations performed in this communication system X when the sleep mode is canceled after the printer 2 has once transferred to the sleep mode are described.

Operations performed until the printer 2 transfers to the sleep mode (S14) are the same as shown in FIG. 5.

If the proxy hub 2 receives print data d21 (i.e., communication data not containing the internal information request command d13) addressed to the printer 2 which is currently in the sleep mode from the host device 3 under conditions where the proxy hub 2 can return a response in lieu of the printer 2 which is currently in the sleep mode, the proxy hub 2 transmits the wake-up signal d22 for canceling the sleep mode to the printer 2 which is designated as the destination of the relevant print data d21 (this corresponds to S44 of FIG. 2).

On the other hand, after the signal monitoring section 27 has detected the wake-up signal d22 and the sleep mode has been canceled (this corresponds to S16 of FIG. 3), the printer 2 which has received the wake-up signal d22 transmits the wake-up notification to the proxy hub 1 (this corresponds to S17 of FIG. 3).

Then, upon verifying that the sleep mode of the printer 2 has been canceled by receiving the wake-up notification, the proxy hub 1 transmits the print data d21 already received from the host device 3 to the printer 2 (this corresponds to S24 of FIG. 2).

From this point onward, the printer 2 performs the normal operations in the normal mode. Therefore, even if the internal information request command d13 is transmitted from the host device 3, the internal information request command d13 is transmitted (transferred) as it is to the printer 2 through the proxy hub 1 and the printer 2 returns a notification d14 of the internal information corresponding to the internal information request command d13.

While the internal information request command is discussed as been common for all of the communication ports 111, ..., 11n in the example shown in FIG. 4 in the above-described embodiment, the proxy hub 1 may be configured such that the internal information request command and the internal information corresponding thereto are stored for each of the corresponding communication ports, for example. According to this configuration, it becomes possible to return a response suited to each network-compatible apparatus even if different types of network-compatible apparatuses are connected to the communication ports.

Also, the proxy hub 1 may be configured such that the proxy hub 1 returns a proxy response only to those network-compatible apparatuses which are connected to specific one or more of the communication ports 111, ..., 11n. According to this configuration, it is possible to reduce memory capacity of the storage unit 12.

As thus for discussed, in a star network configured by connecting a plurality of network-compatible apparatuses (e.g., the printers 2) via a line concentrator, the line concentrator returns a proxy response in lieu of the network-compatible apparatus which is currently in the power save mode (sleep mode) in response to an inquiry from another device according to the present invention. It is therefore possible to prevent the network-compatible apparatus from unnecessarily returning from the power save mode to the normal mode. Furthermore, when in the power save mode, each network-compatible apparatus need not examine the content of a received signal but just a simple circuit for detecting reception of a signal is to be kept operating, so that power consumption during the power save mode can be reduced as much as possible. Moreover, as a single line concentrator can return a proxy response in lieu of a plurality of network-compatible apparatuses, it is possible to achieve a power saving effect in proportion to the number of network-compatible apparatuses connected to one line concentrator.

Additionally, since the line concentrator to which the network-compatible apparatus is connected returns a proxy response, there are not such limitations that the system does not work correctly unless connecting positions of individual apparatuses in the network are taken into consideration as in a case where a specific server returns a proxy response.

The invention claimed is:

1. A line concentrator having a plurality of communication ports for relaying transmissions of communication data exchanged among network-compatible apparatuses connected through the communication ports, comprising:

a response storage portion for storing specific response request information and corresponding response information in association with each other;

a destination information storage portion for storing destination information of the network-compatible apparatuses connected through the communication ports individually for part or all of the communication ports;

a response necessity information storage portion for storing response necessity information indicating whether it is necessary to perform a specific response operation or not for each piece of the destination information; and a control unit for performing:

a communication data judgment operation for judging whether the communication data is a first communication data which can be answered by returning a proxy response, the first communication data containing, as well as the response request information stored in the response storage portion, a destination included in the destination information stored in the destination storage portion and the response necessity information indicating that it is necessary to respond, a second communication data which can not be answered by returning a proxy response, the second communication data not containing the response request information stored in the response storage portion, or an unanswerable communication data other than the first and second communication data;

a transmission prohibit operation for prohibiting signal transmission to the communication port connected to the network-compatible apparatus corresponding to the destination information for which the response necessity information indicates that it is necessary to respond in the case of the first communication data; and a proxy response operation for transmitting the response information corresponding to the response request information contained in the first communication data to the network-compatible apparatus from which the first communication data has been sent, wherein the network compatible apparatus comprises a signal monitoring section for detecting signal transmission from the line concentrator during a power save mode and causing a power supply to transfer to a normal mode when the signal transmission is detected regardless of signal content.

2. The line concentrator as recited in claim 1, wherein if the communication data is the second communication data, the control unit transmits a specific signal to the communication port connected to the network-compatible apparatus that is a destination of the second communication data and transmits a specific response to the communication port after receiving a specific response to the transmitted signal.

3. The line concentrator as recited in claim 1, wherein the response storage portion stores the response request information and the response information individually for part or all of the communication ports.

4. A communication system employing one or more line concentrators as recited in any one of claims 1 through 3.

5. A communication system as in claim 4 further comprising the network-compatible apparatus, comprising:
    a communication port that is connected to the line concentrator; and
    the power supply for supplying electric power suited for normal mode and electric power suited for power save mode.

6. A communication system as in claim 5 further comprising a response information transmission unit for transmitting specific response request information and corresponding response information to the line concentrator.

* * * * *